Oct. 15, 1963  H. C. ABRAMS  3,106,870
POWER CYLINDER AND CONTROL UNIT
Filed April 14, 1960  8 Sheets-Sheet 1

INVENTOR.
HERBERT C. ABRAMS
BY
Barnes, Kisselle, Raisch
& Choate
ATTORNEYS

Oct. 15, 1963  H. C. ABRAMS  3,106,870
POWER CYLINDER AND CONTROL UNIT
Filed April 14, 1960  8 Sheets-Sheet 4
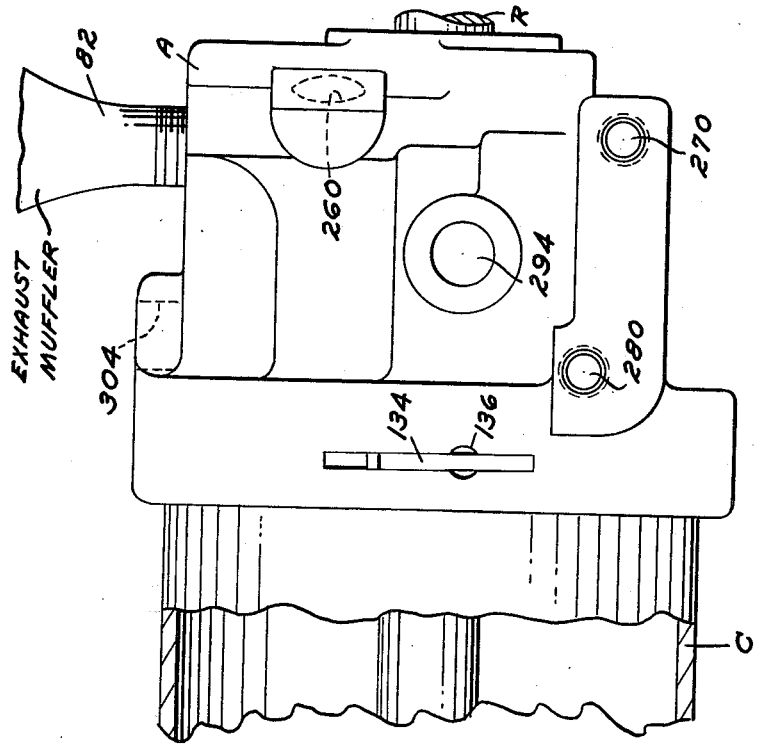
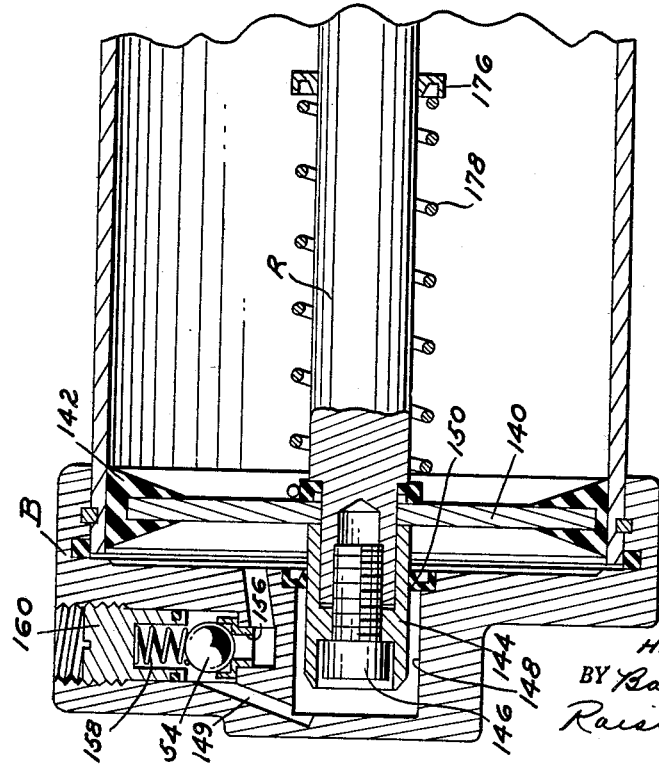
FIG. 4
INVENTOR.
HERBERT C. ABRAMS
BY Barnes, Kisselle,
Raisch & Choate
ATTORNEYS Oct. 15, 1963 H. C. ABRAMS 3,106,870
POWER CYLINDER AND CONTROL UNIT
Filed April 14, 1960 8 Sheets-Sheet 5
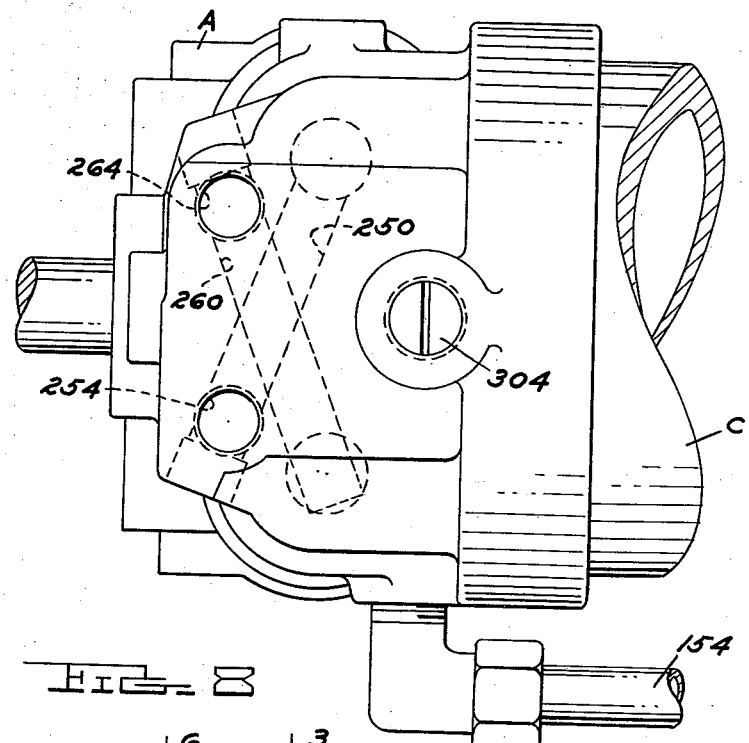
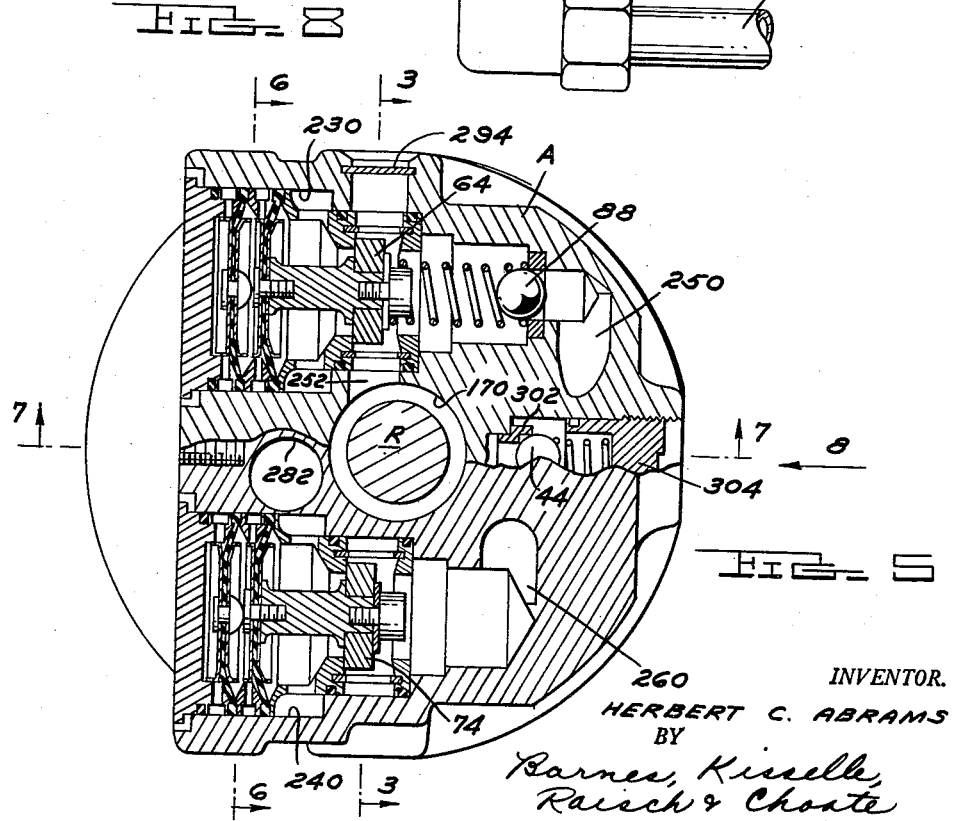
INVENTOR.
HERBERT C. ABRAMS
BY
Barnes, Kisselle,
Raisch & Choate
ATTORNEYS Oct. 15, 1963

H. C. ABRAMS 3,106,870

POWER CYLINDER AND CONTROL UNIT

Filed April 14, 1960

8 Sheets-Sheet 6

INVENTOR.
HERBERT C. ABRAMS
BY
Barnes, Kisselle, Raisch & Choate
ATTORNEYS

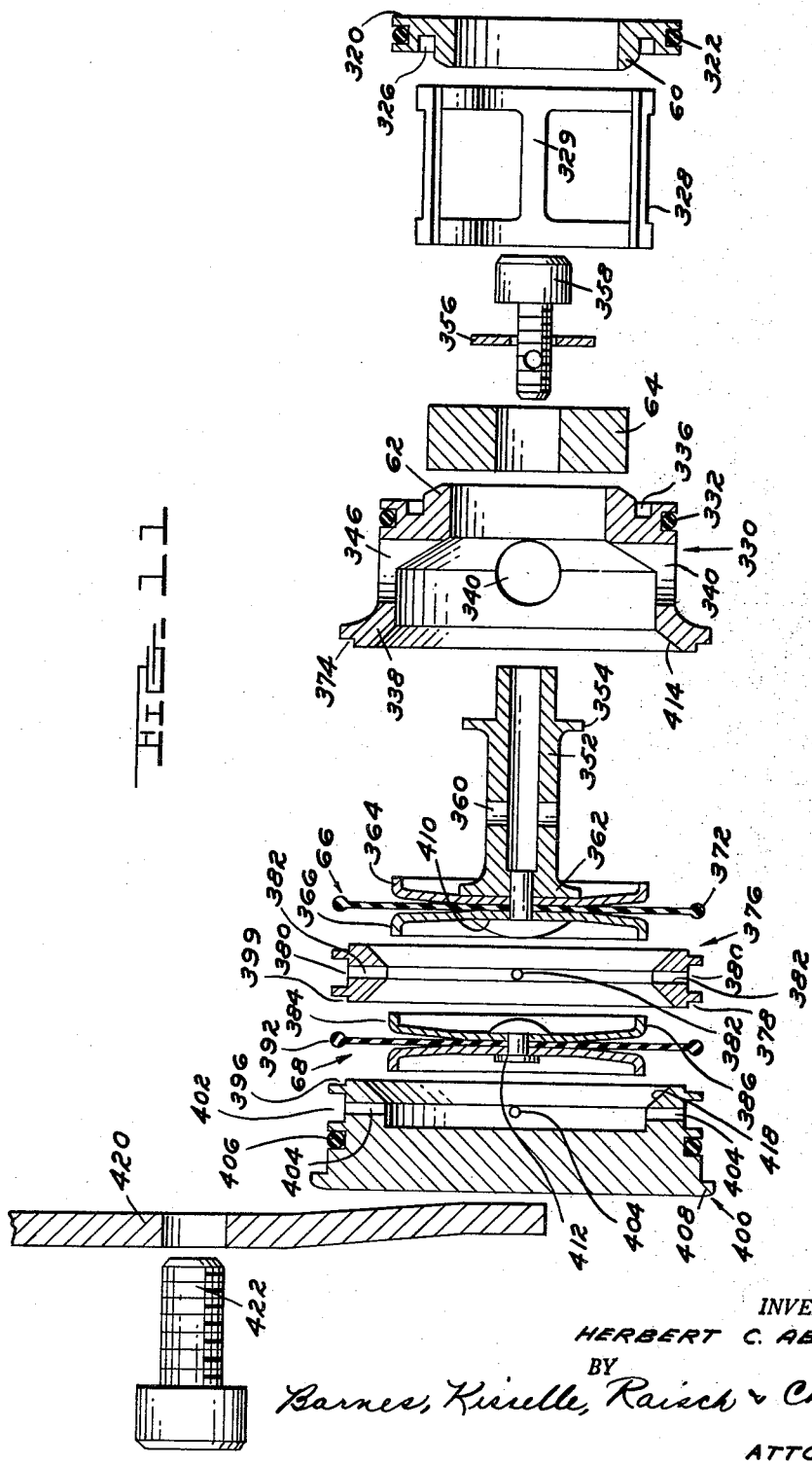

Oct. 15, 1963     H. C. ABRAMS     3,106,870
POWER CYLINDER AND CONTROL UNIT
Filed April 14, 1960     8 Sheets—Sheet 8
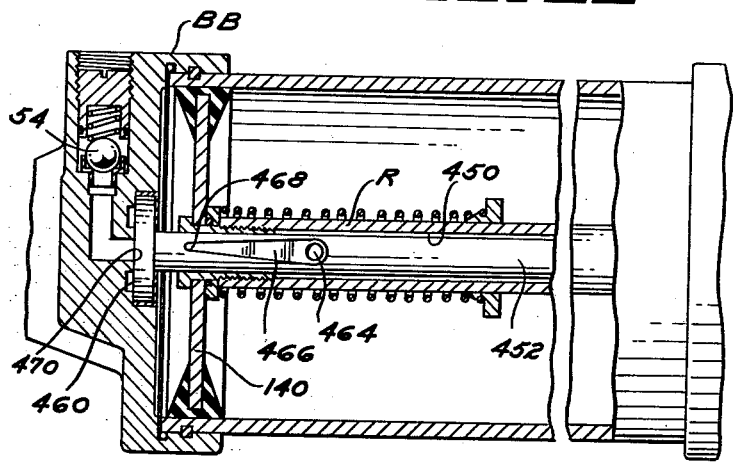
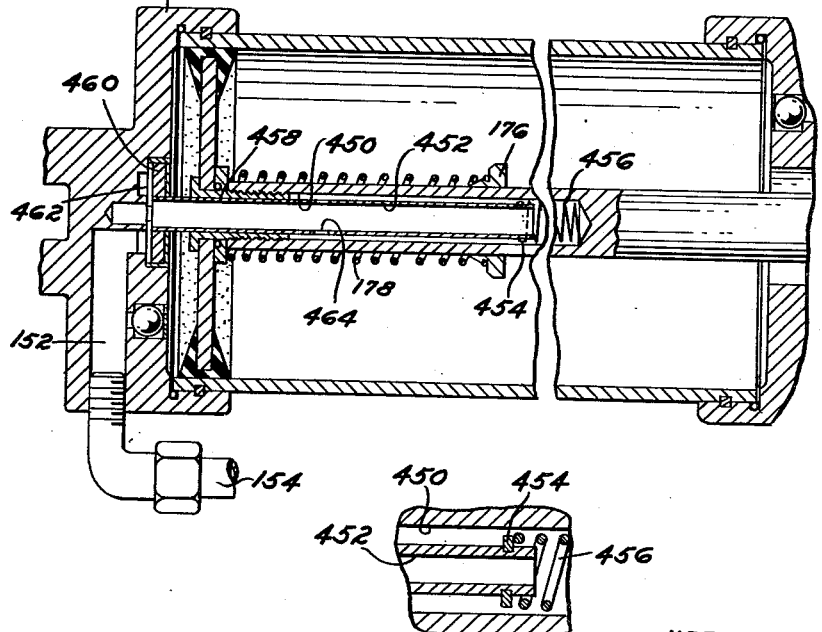
INVENTOR.
HERBERT C. ABRAMS
BY Barnes, Kisselle,
Raisch & Choate
ATTORNEYS

United States Patent Office 3,106,870
Patented Oct. 15, 1963

3,106,870
POWER CYLINDER AND CONTROL UNIT
Herbert C. Abrams, 8909 Hubbell Ave., Detroit 28, Mich.
Filed Apr. 14, 1960, Ser. No. 22,211
25 Claims. (Cl. 91—26)

This invention relates to a power cylinder and control unit for a pneumatic system.

It is an object of the invention to provide a power cylinder with practically all of the control valves mounted right in the cylinder base and head to avoid a complexity of piping around the unit.

It is a further object to provide a control valve which is adaptable not only for pilot operation but for a pilot hold circuit which allows a timing delay to occur in the cycle of operation.

A further object for a provision of an usual deceleration device which allows a change-over from one decelerating value to another as the piston stroke continues. Thus in the system no springs are required for the return stroke, there being a power actuation in both directions. In addition, the system is so worked out that it is locked in one position by the fluid in the system itself in the event of a power failure.

Another object of the invention is the structure of the control valves which permit diaphragm action with very little pressure strain on the diaphragms when in their stressed position.

Other objects and features of the invention relating to the details of construction and operation will be apparent in the following description and claims.

Figure 1:
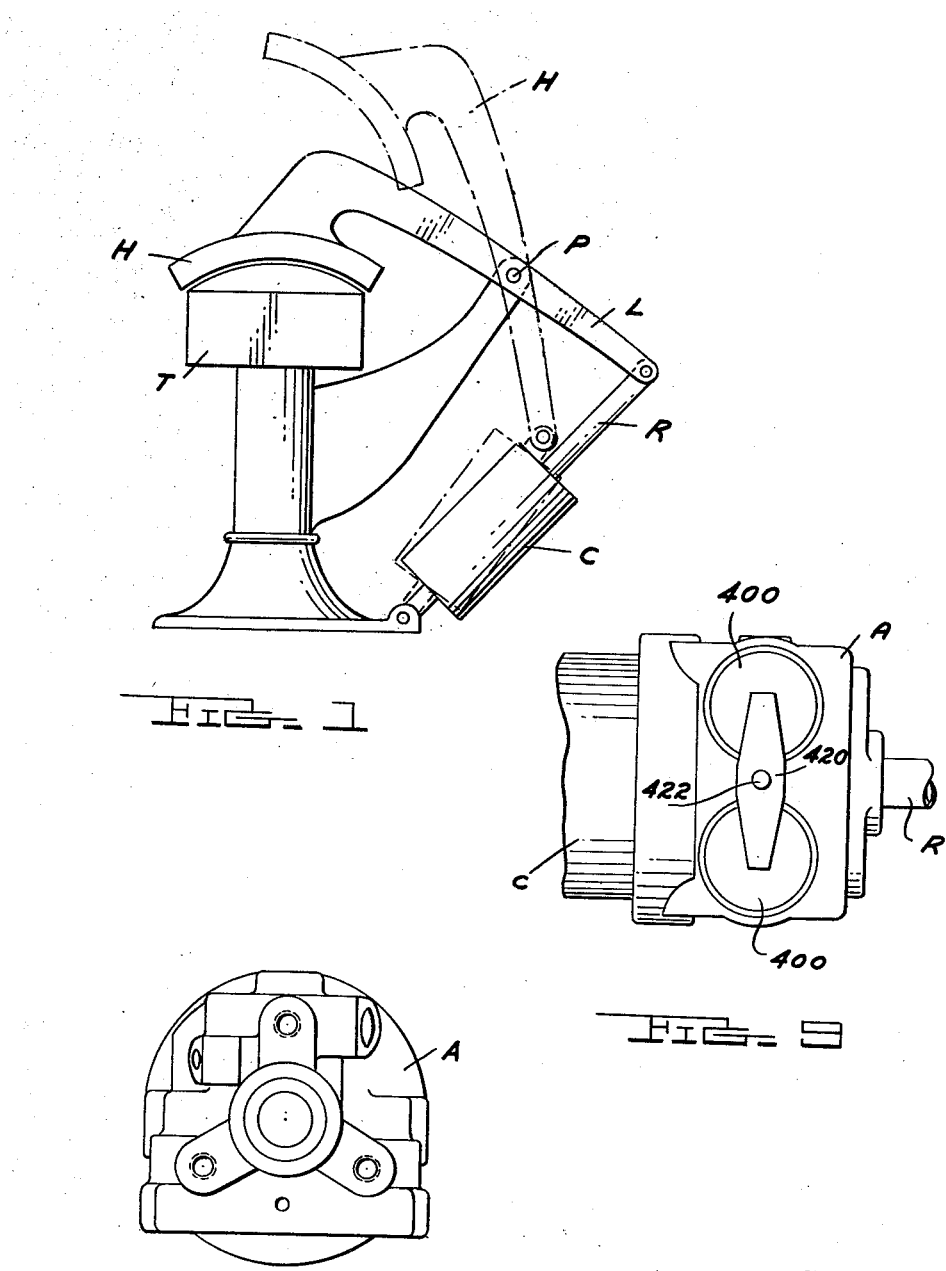

Drawings accompanying the disclosure and the various views thereof may be briefly described as:

FIGURE 1, a view of a pressing machine showing the application of a cylinder for actuation of the movable head.

Figure 2:
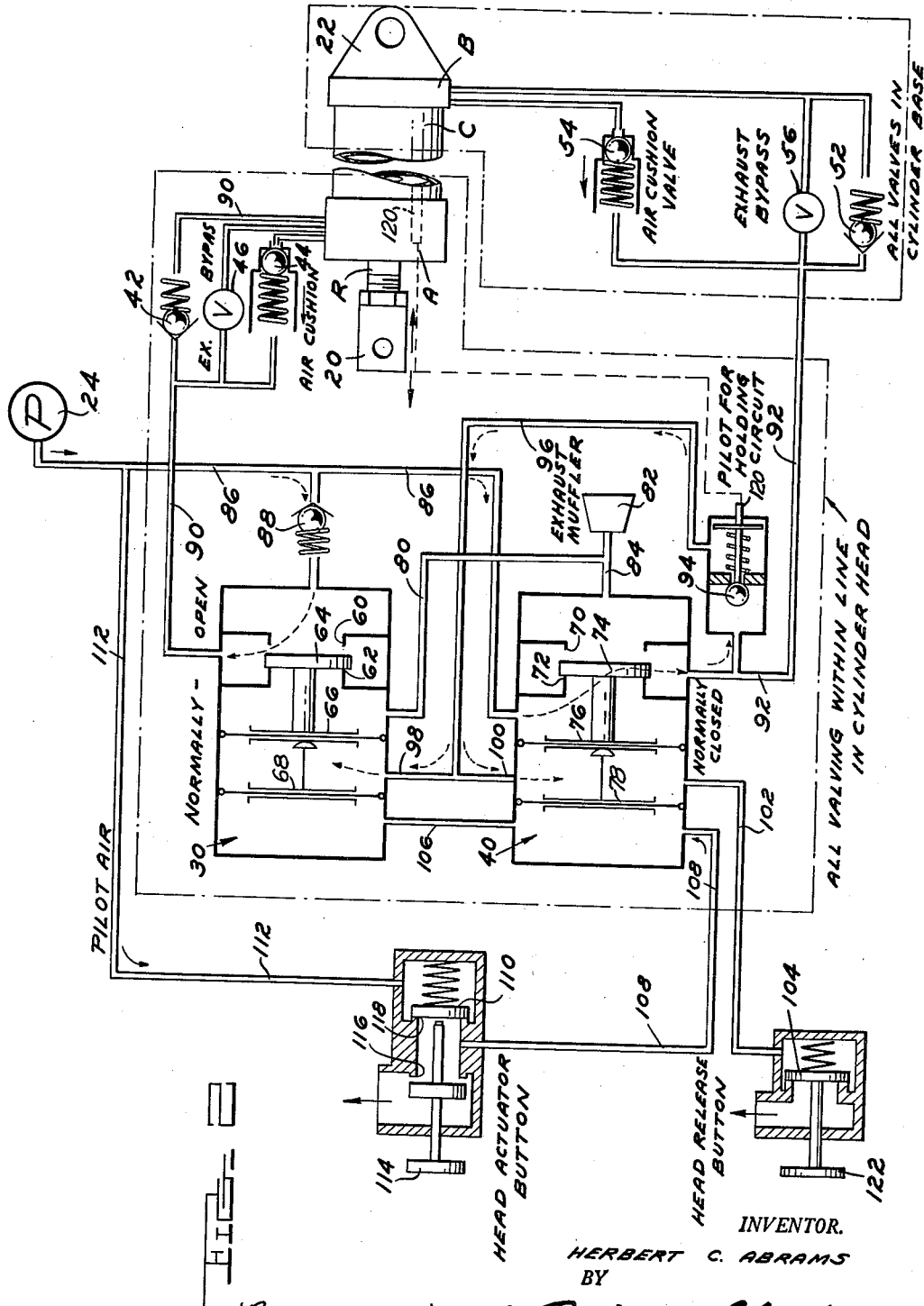

FIGURE 2, a diagrammatic view of the parts of the control and cylinder arranged to facilitate an understanding of the parts and the circuit.

Figure 3:
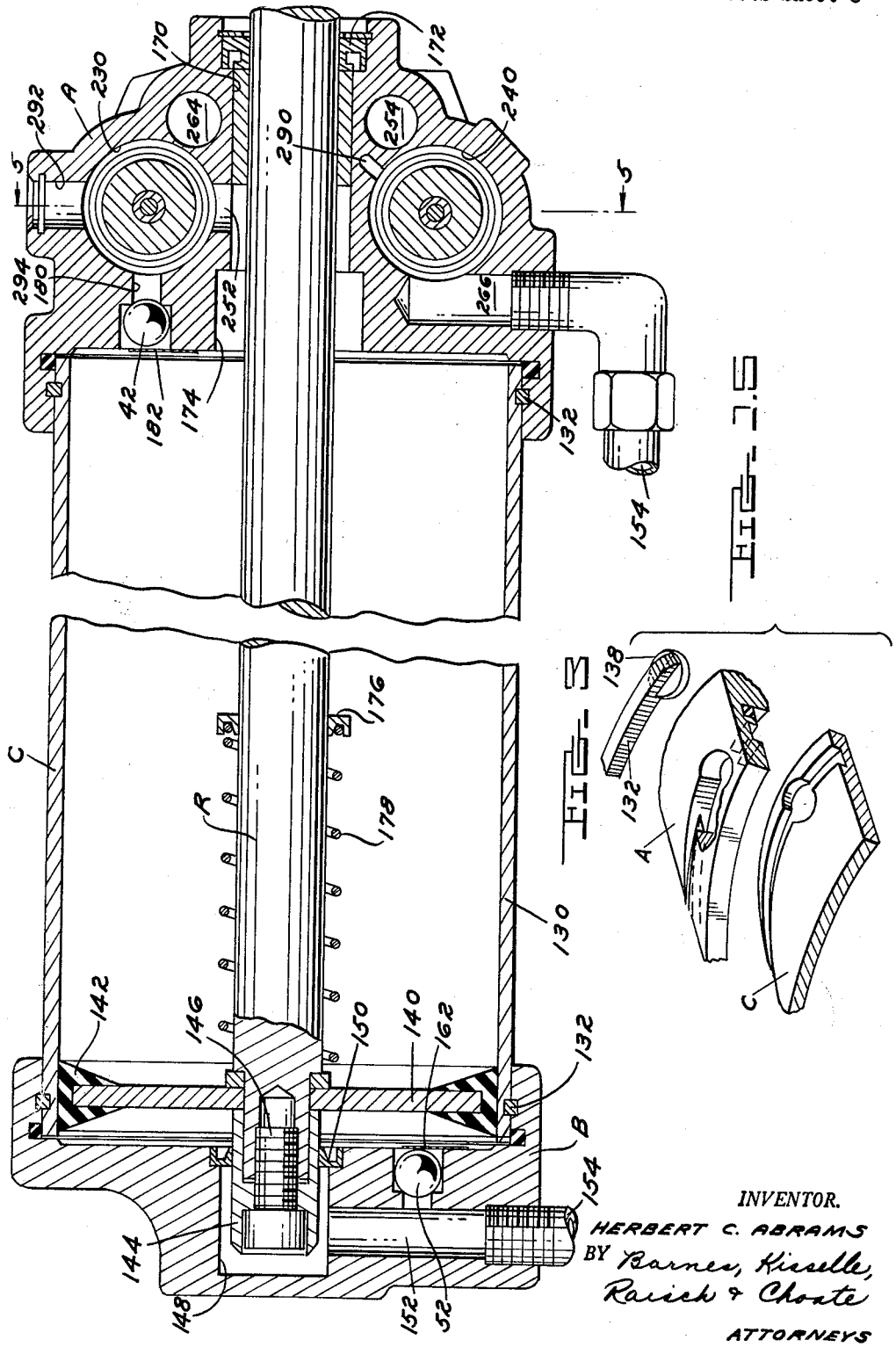

FIGURE 3, a longitudinal section of the cylinder showing the two heads in section.

FIGURE 4, a second longitudinal section of the bottom head of the cylinder taken at right angles to the view of FIGURE 3.

FIGURE 5, a sectional view of the cylinder head on line 5—5 of FIGURE 3.

FIGURE 6, a sectional view of the cylinder head on line 6—6 of FIGURE 5.

Figure 7:
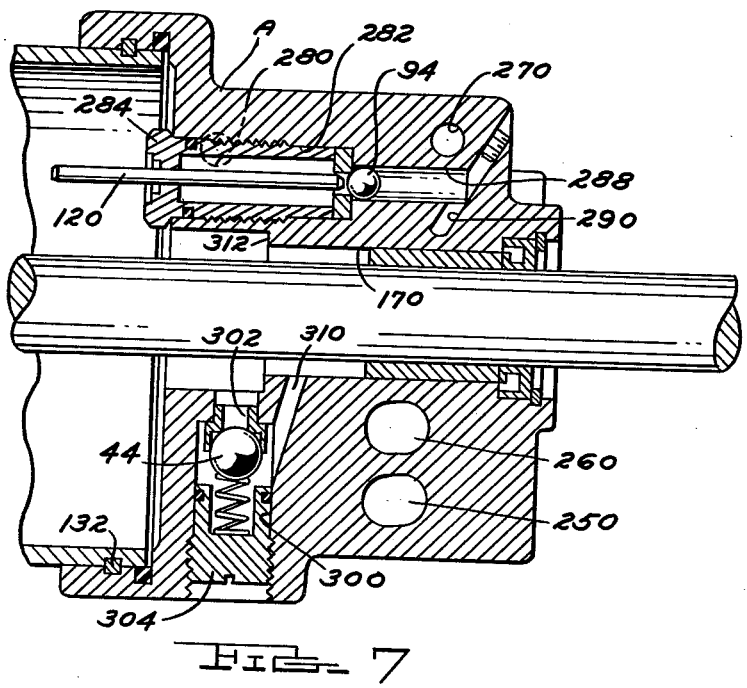

FIGURE 7, a sectional view of the cylinder head on line 7—7 of FIGURE 5.

Figure 8:
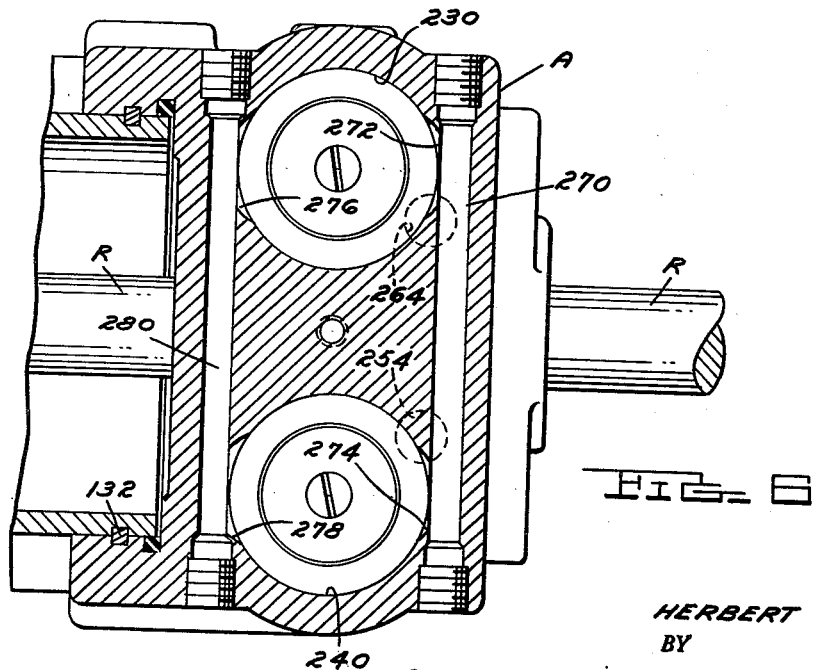

FIGURE 8, a view of the outside of the cylinder head taken at arrow 8 of FIGURE 5.

FIGURE 9, a view of the valve side of the cylinder head showing the clamping mechanism.

FIGURE 10, a view of the top of the cylinder head.

FIGURE 11, an exploded view of the valve parts.

FIGURE 12, a sectional view of a modified lower end of the cylinder showing a speed reducing mechanism.

FIGURE 13, a view similar to FIGURE 12 at a different angle through the base end of the cylinder.

FIGURE 14, an enlarged view of a portion of the speed reducing stem on FIGURE 13.

FIGURE 15, a detail of the retaining end of a retaining ring for the piston and cylinder assembly.

The invention relates to an actuating and control cylinder for a machine element. In FIGURE 1 a control cylinder C is used as an actuator and control for a head H on a pressing table T. The head H is pivoted at P and is controlled by a piston rod R which is connected to the arm L.

*Diagrammatic View*

It is believed that the entire invention may be best understood if reference is first made to the diagrammatic presentation shown in FIGURE 2. In FIGURE 2 the cylinder C has a rod end A and a head end B. The piston rod R projects from the end A with a connecting ring mechanism 20 for suitable fastening to a device to be actuated. The end B of the cylinder has a bi-furcate fastening gusset 22.

The actuating fluid for the circuit is provided from a pump 24 which forms a source not only for the main fluid acting against the piston in the cylinder C but also for pilot air which is utilized in the control valve. The main control valves comprise a normally open valve 30 and a normally closed valve 40, each of which is composed of a number of parts shown in detail in FIGURES 5 and 11 which will be described later. The cylinder end A has an inlet check valve 42, an outlet check valve 44 and an exhaust bypass valve 46. The end B has an inlet check valve 52, an outlet check valve 54, and an exhaust by-pass valve 56.

The main valve 30, normally open, has a lower seat 60, an upper seat 62, a valve member 64, an actuator diaphragm 66 and an actuator diaphragm 68. The main valve 40, normally closed, has lower seat 70, an upper seat 72, a valve member 74, a control diaphragm 76 and a control diaphragm 78.

The chamber above the seat 62 of valve 30 is connected by a conduit 80 to an exhaust muffler 82. The valve chamber below the seat 70 of valve 40 is connected by a conduit 84 to the same exhaust muffler. The seat 60 of valve 30 is connected to inlet pressure from pump 24 through a conduit 86 and a check valve 88. The chamber above seat 72 and valve 40 is connected to the source of pressure also through pipe 86 which continues to valve 40. The upper end A of the piston is connected to valve 30 through a conduit 90 leading to check valve 42 and valve 46, and the end B of the cylinder is connected to the chamber below the seat 72 of valve 40 by a conduit 92. A valve 94 is also connected to conduit 92 as a source of pilot air leading through a conduit 96 to dividing conduits 98 and 100 leading respectively to the chambers of valves 30 and 40 between the respective diaphragms 66—68 and 76—78. The space between diaphragm 76 and 78 of valve 40 is connected by a conduit 102 to a head release valve 104. The chambers in the valves 30 and 40 above the uppermost diaphragms 68 and 78 are connected by conduits 106 and 108 to a control valve 110 which receives pilot air from the pump through a conduit 112.

In the operation of the device as shown in FIGURE 2, it will be seen that pressure from pump 24 will pass through check valve 88 to valve 30 and pass the normally open seat 60 to conduit 90 where it enters the cylinder, first through valve 42 and then through valve 46, tending to move the piston (not shown) toward the base B. As the device is set up as shown in FIGURE 1, this will lift the head H. Assuming, for example, that the pressure in the circuit was now cut off by reason of a power failure, any tendency on the part of the head to drop down would simply tend to close the valve 64 in the position shown in FIGURE 2 and to close the valve 88, thus maintaining the valve 30 in its shown position and keeping the head up until power was restored. This is a safety feature of the device.

As the piston moves toward the end B, the exhaust air from the base will pass through outlet valve 56 and finally through air cushion valve 54 having a double seat control as described in detail in my co-pending application Serial No. 807,140, now Patent No. 3,010,435. Valve 44 at the end A is of similar construction. Air passing out of valve 56 enters the conduit 92 leading to the valve 40 and flows past the open seat 70 to the exhaust conduit 84.

When it is desired to lower the head H or move the piston from the base of the cylinder to the end A again, the actuator button 114 is moved to close a valve seat 116 and open the valve seat 118 by shifting the valve 110. This permits a constant source of pilot air to flow from conduit 112 to conduit 108 and 106 leading to the top of the valves 30 and 40 and shifting the diaphragms 68 and 78 downwardly.

These diaphragms are so constructed as shown in FIG-URE 5 that downward actuation thereof will shift the valves 64 and 74 respectively to the other seats 60 and 70. This opens the conduit 90 to the conduit 80 through valve 30 connecting the end A of the piston through cushion valve 44 to exhaust and this movement of valve 40 opens the pressure conduit 86 through the seat 72 to the conduit 92 admitting pressure initially through the valve 52 and finally through valve 56 to the end B of the cylinder, causing motion of the piston rod R to the left.

During this motion, the valve 46 in end A functions to relieve the exhaust air in the cylinder through the valve 30. At the end of the stroke of the piston rod R the air cushion valve 44 functions to decelerate the motion, and the piston can be arranged to actuate a pilot valve 94 through a pin 120 which admits pilot air from what is now a pressure conduit 92 to the pilot passage 96 leading to the branching passages 98 and 100, opening to the chamber between the diaphragms of each valve. This holding pressure tends to hold the valves 64 and 74 in their shifted positions previously described resulting from the actuation of the valve 110. This permits the head actuator button 114 to be released without effecting the circuit. This motion has caused the downward motion of the head H shown in FIGURE 1 and at a suitable time the operator can move the head release button 122 to open the valve 104 and relieve the pilot pressure between the diaphragms of each valve 30 and 40 to atmosphere. This will cause an automatic shifting of the valves 30 and 40 by the action of the basic pressure fluid to the positions shown in FIG-URE 2 and thus recycle the operation.

*Cylinder Base and Piston*

Turning now to the actual construction of the unit, reference is made to FIGURE 3 where it is seen that the cylinder C is made up of the rod end A and the head end B, each of which has a suitable cylindrical recess to receive a cylinder shell 130. The shell is retained in the heads by internal retaining rings 132, each of which are inserted through a recess 134 (FIGURE 4), the recess having a circular enlargement 136 to receive a button 138 (see FIGURE 15) on the end of the retaining ring. The button 138 is recessed into a pocket in one portion of the shell and then it is simply a matter of turning the shell to draw the retaining band into the machined annular grooves or to push it out of said grooves. The cylinder has a piston 140 on the rod R, the piston 140 having a sealing member 142 at its circumference. The piston is held on to the rod R by a cylindrical extension 144 held in place by a headed bolt 146. The extension is received by a bore 148 on the inside of the end B. A sealing member 150 is provided at the open end of this bore to receive the extension 144. The cooperation of this extension 144 and the sealing ring 150 in effect creates a valving action to close off the main outlet of the cylinder to the passage 152 leading through the pipe 154 to the rod end A of the cylinder. This in effect creates the exhaust by-pass valve designated at 56 in FIGURE 2.

When the projection 144 enters the sealing ring 150, the only escape from the piston thereafter is through the air cushion valve 54 (see FIGURE 4). This valve acts in a stainless steel seat 156 having the double orifice arrangement which increases the cushioning effect with a subsequent pop-off release to prevent bounce as described in the aforesaid application referred to. A spring 158 can be adjusted by a screw plug 160. Also in the end B is the preliminary inlet valve 52, previously referred to, held in place by a small leaf spring 162. This valve permits air to enter the cylinder while the plunger 144 is in the position shown in FIGURE 3. When the piston has moved a little distance to the right, the air inlet is free through the passage 148 and seal 150.

*Cylinder Head*

Referring now to the rod end A of the cylinder, it is provided with a main central bore 170 (FIGURE 3, FIG-URE 5) having a seal 172 at the outer end and having an enlarged bore 174 at the inner end. The enlarged bore is intended to receive a sealing ring 176 mounted on the end of a coil spring 178 surrounding the piston rod R. This in effect creates the exhaust by-pass valve 46 of the circuit diagram. The preliminary inlet valve for the head end of the cylinder is shown as a check ball 42 held in place in a passage 180 by a leaf spring 182. On either side of the piston rod bore 170 and transverse thereto are stepped valve bores 230 and 240, and passage 180 connects to bore 230 at the intermediate step portion.

The base end of the stepped bore 230 contains the previously described check valve 88 which connects to a cross passage 250 (FIGURE 8) in the casting A which forms the rod end. The intermediate step of bore 230 is connected to the piston rod bore 170 through a short passage 252. The previously referred to passage 250, which is a pressure inlet passage, connects to the large end of bore 240 through a riser passage 254 extending parallel to the bore 240 (see FIGURE 3, FIGURE 6). An exhaust passage 260 (FIGURE 8) connects to the bottom of bore 240 and through riser passage 264 to the enlarged section of bore 230.

The intermediate step of bore 240 is connected to the end B of the cylinder through side passage 266 in end A and conduit 154 having suitable fittings (FIGURE 3).

The pilot connections to the enlarged ends of bores 230 and 240 are accomplished in end A by two tandem parallel passages 270 and 280 at different levels, see FIGURE 6.

The upper level tandem passage for pilot air is 270 and its connects to the large step of both bores 230 and 240 by break-through ports 272 and 274. The lower level tandem passage for the holding air is 280 and it connects to the large step of both bores 230 and 240 by break-through ports 276 and 278 each at lower level than ports 272 and 274. As will be seen later, ports 272 and 274 enter the valve chamber above the top diaphragms 68 and 70, while ports 272 and 274 enter the valve chambers between the diaphragms of each valve. Passage 280 is connected also to a valve chamber 282 for pilot holding circuit valve 94 (see FIGURE 8). Chamber 282 contains a cartridge 284 threaded into the body A forming at the inner end a seat for valve 94. A slide pin 120 in cartridge 284 serves as an actuator for ball 94 in passage 288. Passage 288 is connected to the intermediate section of bore 240 by an angled cross-passage 290, FIGURE 7 and FIGURE 3. In FIG-URE 3, the hole 292 is incidental to forming of passage 252 and is plugged in operation by disc 294.

In FIGURE 7, a by-pass exhaust 44 is mounted in a side bore 300 having a seat 302 of the double stage type described in my Patent No. 3,010,435. This seat tends to pass air slowly under a certain flow and upon increased flow pops the ball off the second seat to allow maximum flow and relief of pressure to prevent bounce. A plug 304 locates and adjusts spring 306 biased against valve 44. A by-pass port 310 leads from valve 44 to piston rod bore 170, this bore being closed initially when ring 176 (diagrammatic valve 46, FIGURE 3) reaches seat 312.

*Main Valve Mechanism*

The valve parts for main valves 30 and 40 are shown assembled in FIGURE 5 but can best be seen in the exploded view of FIGURE 11. Mountable in the bottom of the intermediate chambers of stepped bores 230 and 240 is a small disc and seat 320 having a sealing ring 322 and an annular seat 60. In this ring is an annular groove 326 in which seats a ring 328 having an open side construction with connecting bars 329. An intermediate valve ring 330 has a similar O-ring seal 332 with a seat 62 and an annular recess 336 to receive the top of open ring 328. Ring 330 has a top flange portion 338 and the side walls are apertured at 340 to permit free passage of air. These parts, that is, the rings 320 and 330 and the spacing ring 328 are mounted in the intermediate portion of the stepped bores 230 and 240 as described so that the spaced seats then are associated properly with air passages leading to this portion of the valve bores. For example, in valve 230, it will be seen that the port 252 from the piston rod bore 170 is connected to the valve seats. As shown in FIGURE 5 and as shown in FIGURE 3, the intermediate portion of bore 240 is connected to passage 266 leading to end A as well as to passage 290 leading to chamber 288. These portions of the bore are also connected to the riser passages 254 and 264 shown in FIGURE 3 rising respectively from passages 250 and 260 shown in FIGURE 8.

The valve mechanism for controlling the seats 60 and 62 comprises a plastic disc formed of nylon or Teflon. In the diagrammatic presentation, this valve part in main valve 30 and in the valve bore 230 may be referred to as 64 and in the valve 40 and main valve bore 240 as 74. This disc is carried by a valve arbor 352 having a locating flange 354 for the disc 64 (or 74) which is held in place by a washer 356 and a headed bolt 358. The arbor has a cross passage 360 which permits the insertion of a capstan pin to permit tightening of the bolt 358.

At the other end of the arbor from the valve seat mount is a second flange 362 which serves as a mounting location for two diaphragm discs 364 and 366 which sandwich a flexible diaphragm disc 66. The diaphragm disc has an integral annular ring 372 which helps to seal the discs at the side between the ring 330, which has a receiving annular recess 374 and an intermediate ring 376, which has an annular recess 378 for receiving the annular portion 372 of diaphragm 66. The ring 376 also has a central annular groove 380 which is perforated by ports 382 around the ring. A second diaphragm assembly having plates 384 and 386 with a diaphragm 68 is of similar construction to the one already described and the annular ring edge 392 cooperates with a groove 394 in the ring 376 and a groove 396 in the top valve cap 400. The valve cap 400 has also an annular groove 402 on the side wall with perforations 404 and a sealing ring 406 is mounted above the groove 402. At the top of the cap 400 is a small flange 408 for locating it on the valve housing.

It will be noted that the diaphragm assembly with the ring 376 and the cap 400 is all mounted in the enlarged portion of the stepped bores 230 and 240 together with the top portion of the ring 330. In the diagrammatic presentation of FIGURE 2, the diaphragms are referred to as 66 and 68, in the valve 30, and as 76 and 78 in the valve 40.

The diaphragm assembly 364—366 is held into the arbor 352 by a screw or rivet 410 and the diaphragm assembly 384—386 is also held assembled by a rivet 412. It will be further noted that the surfaces directly adjacent the diaphagms in each case have an angled or beveled ring to furnish the port for the diaphragm. Ring 330, for example, has an annular beveled surface 414. The ring 376 has beveled surfaces on each side and the ring 400 has an annular beveled surface 418.

It will be seen from the assembly in FIGURE 5 that the throw of the diaphragms is very short and that together with the center discs which support them and the beveled annular surfaces described, the diaphragms are almost fully supported under pressure conditions. Furthermore, the diaphragms are sufficiently closely mounted that pressure, for example, on the outer diaphragm 68 will exert against the rivet holding the inner diaphragm 66 and push the valve arbor down. The chamber above the diaphragm 68, that is, to the left of these diaphragms in FIGURE 5 is connected to the pilot 270 as shown in FIGURE 6. The area between the diaphragms as shown in FIGURE 5 is connected through the apertures in the ring 376 to the holding pilot passage 280. The entire valve assemblies are held in the body by a simple spanning plate 420 held in place by a headed bolt 422.

*Operation of the Main Valve Mechanism*

Reference is made to the previous description of the operation in connection with the diagrammatic presentation of FIGURE 2. The operation of the valves as actually designed and shown in FIGURES 5 and 11 will be obvious. Pressure behind the diaphragms 68 and 78 will shift the valves 64 and 74 respectively toward the seats 60 and 70. Pressure between the diaphragms from the holding circuit reaching passage 280 of housing A will also hold the valve seats 64 and 74 to the right as viewed in FIGURE 5. A relief of both pilot and holding pressure in each case will cause the valves to move to the left to the seats 62 and 72 respectively by reason of the differential pressure between the valve members 64 and 74 and the diaphragms 66 and 76. Valve 30 is a normally open valve, and this corresponds to the valve 64 in valve bore 230. Valve 40 is a normally closed valve, and this corresponds to the valve 74 in the bore 240.

In viewing the parts as shown in FIGURE 5, pressure enters the valve end A through passage 250 from a suitable pressure source, passes the ball check 88 and the valve member 64 to port 252 where it enters the piston rod bore 170 and moves the piston downwardly, to the left as viewed in FIGURE 3. Air is leaving the end B of the assembly in FIGURE 3 through the passage 152 and the conduit 154 to the port 266 adjacent valve 240. From this port it passes the valve member 74 to the exhaust outlet 260 leading to the muffler 82. This action will continue until the projection 144 on the piston hits the sealing ring 150. This closes off the port 152 from free-flow out and directs the exhausting air through the passage leading to the seat 156 and check valve 54. As the air moves slowly past this valve 54, it may reach again the passage 152 through chamber 148 and the cross bar 149. As the pressure builds up in the base of the cylinder, the ball 54 will finally pop or crack away from both seats and the pressure in the cylinder will be almost entirely relieved.

On the reverse construction, this is initiated by the use of the head actuator button 114 shown in FIGURE 2. This directs pilot air to the tandem passage 270 in the rod end A, thus actuating both diaphragms 68 and 78 to the left as viewed in FIGURE 5 and moving both valve members 64 and 74 to the right to the bottom seats 60 and 70. Pressure thus is cut off from the end A of the piston and is directed from passage 250 and riser 254 to the port 266 adjacent valve 240 and then to the conduit 154, passage 152 to the small check valve 52. This admits pressure initially to the base end of the piston 140; and as the piston begins to move to the left as shown in FIGURE 3, the projection 144 leaves the seal ring 150 and there is free-flow into the end B of the cylinder. Meanwhile exhaust from the end A of the piston is passing through valve 230, past the valve member 64 and out of the riser passage 264 to the exhaust passage 260.

As the piston approaches the end B, the spring-backed seal ring 176 (FIGURE 3) enters the bore 174 and closes off the piston bore 170; this shuts off the exhaust escape through valve 230 directly through the passage 252 and passes the escaping air through the seat 302 past the valve 44 to a cross port 310 which directs it back through the bore 170 and the valve 230 to the exhaust passage.

Valve 44 is the double seat pop-off type of valve previously described which decelerates the piston. As the piston approaches the end A, it will also contact the pin 120 which pops the valve 94 off from its seat and admits pilot air from the cross-passage 290 leading from the valve 240 to the tandem passage 280 which enters the chambers between the diaphragms of valves 230 and 240 to hold the valve members 64 and 74 to the right as viewed in FIGURE 5. Subsequently, either by an automatic timing device or by a head release button 122 (FIGURE 2), the hold pressure can be relieved and the cycle will again start.

*Modified Deceleration Device*

If a finer control is desired at the head end B motion of the piston, this can be accomplished through the mechanism shown in FIGURES 12 and 13. In these figures, the piston rod R is provided with a hollow bar 450 for receiving a hollow piston rod or tube 452. This tube has a split ring 454 at the outer end which serves as a seat for a spring 456 seated at the blind end of the bore 450. This tube 452 passes through a threaded thimble 458 in a sliding fit, and it has at the end of it a piston 460 with a small sealing disc 462 at the end. The tube 452 also has a cross hole 464, around and below which, on each side of the tube, is milled a flat portion 466 which gradually tapers to nothing at 468. The head end BB is slightly modified from head B but still has the exit and inlet port 152 and the deceleration valve 54.

As the piston moves toward the end BB, egress of air is free through port 152 until the piston 460 seats at 470. At this time, passage 152 is closed off and air must exit through the hole 464 in tube 452 where it passes through the center of the tube down through the center of the piston 460 to the valve 54. As the piston moves into the piston rod, this exit port through hole 464 is gradually ensmalled as the flats 466 taper off and finally the only exit for air is through the normal clearance around the tube within the thimble 458. The piston thus comes to a very gradual stop, and there is no bounce of the piston at either end of the motion.

It will thus be seen that I have disclosed a very compact valve arrangement for a power cylinder wherein practically all of the controls are mounted with the cylinder. If trouble develops, a cylinder rod end or head end can be readily replaced or a single operating valve in these parts can be readily replaced. In addition, the control unit contains the deceleration devices required to slow down the motion of the moving part at the end of the stroke with the added feature that the part will not bounce at the end of the stroke as a result of air compressed into the ends of the cylinder.

One other feature of the diaphragm valves should be mentioned. As shown in the view of FIGURE 1, the diaphragms 66 and 68 are flat. In actual practice the two supporting washers for the diaphragms are pressed together and riveted with sufficient pressure that the diaphragms take a dished shape such as shown in FIGURE 8. The central portion of the diaphragm is squeezed out and this results in the dished or conical shape of the part. With this assembly, the diaphragm need not stretch to assume its two extreme positions but actually compresses a little as it moves in a snap-over action from one position to another. This feature gives the diaphragms a very long life and prevents the usual tearing and breakdown caused when the diaphragm must stretch on each flexing.

What is claimed is as follows:

1. A self-contained power cylinder and control which comprises a cylinder having a head end and a rod end, a sleeve interposed between said ends to complete the cylinder construction, means interlocking said cylinder with said ends, a piston and piston rod in said cylinder, said rod passing through an opening in one of the ends of said cylinder, and one of said ends having a unidirectional inlet valve, a unidirectional outlet valve, and a dual directional inlet and outlet valve, means on said piston to close said dual directional valve wherein at the end of the stroke of the piston toward one of said ends the inlet and outlet to said cylinder is limited to said unidirectional valves, said means on the said piston comprising a plunger which passes into an opening in the base to close said opening as the piston approaches said one end.

2. A self-contained power cylinder and control which comprises a cylinder having a head end and a rod end, a sleeve interposed between said ends to complete the cylinder construction, means interlocking said cylinder with said ends, a piston and piston rod in said cylinder, said rod passing through an opening in one of the ends of said cylinder, and one of said ends having a unidirectional inlet valve, a unidirectional outlet valve, and a dual directional inlet and outlet valve, means on said piston to close said dual directional valve wherein at the end of the stroke of the piston toward one of said ends the inlet and outlet to said cylinder is limited to said unidirectional valves, the other end of the cylinder having also unidirectional inlet and outlet valves and a dual inlet-outlet valve, and means on said piston for closing said dual valve as the piston approaches the said other end wherein the only ingress and egress from the cylinder is from the unidirectional valves, the said means on the said piston comprising in each case a plunger adapted to enter an opening in the respective ends as the piston approaches the particular end to close the dual valve.

3. A self-contained power cylinder and control which comprises a cylinder having a head end and a rod end, a sleeve interposed between said ends to complete the cylinder construction, means interlocking said cylinder with said ends, a piston and piston rod in said cylinder, said rod passing through an opening in one of the ends of said cylinder, and one of said ends having a unidirectional inlet valve, a unidirectional outlet valve, and a dual directional inlet and outlet valve, means on said piston to close said dual directional valve wherein at the end of the stroke of the piston toward one of said ends the inlet and outlet to said cylinder is limited to said unidirectional valves, the other end of the cylinder having also unidirectional inlet and outlet valves and a dual inlet-outlet valve, and means on said piston for closing said dual valve as the piston approaches the said other end wherein the only ingress and egress from the cylinder is from the unidirectional valves, the said means for closing the dual valve in the said other end comprising an annular plunger means mounted around said piston rod and spring means locating said plunger means axially and biasing said plunger toward said other end as said piston approaches said other end.

4. A self-contained power cylinder and control which comprises a cylinder having a head end and a rod end, a sleeve interposed between said ends to complete the cylinder construction, means interlocking said cylinder with said ends, a piston and piston rod in said cylinder, said rod passing through an opening in one of the ends of said cylinder, and one of the said ends having a unidirectional inlet valve, a unidirectional outlet valve, and a dual directional inlet and outlet valve, means on said piston to close said dual directional valve wherein at the end of the stroke of the piston toward one of said ends the inlet and outlet to said cylinder is limited to said unidirectional valves, the said means for closing the dual valve comprising a plunger having a valve portion at the outer end thereof and a shaft slidably received in an opening in said piston rod, means biasing said shaft outwardly of said piston rod, said shaft being hollow and having a transverse opening passing down through said valve portion, and an air passage formed on the side of said shaft from said transverse opening toward said valve portion gradually ensmalling wherein air at the said one end of said piston may pass through said transverse opening and said shaft as the piston approaches the said one end, said passage of air being gradually restricted as the piston approaches the base end.

5. A self-contained power cylinder and control which comprises a cylinder having a head end and a rod head end, a piston in said cylinder having a rod passing through one of said ends, unidirectional inlet and outlet valves from said ends to said piston, and a dual directional outlet valve in each of said respective ends and dual means on said piston for closing each said dual direction valve as the piston moves toward a respective end, one of said dual means comprising a plunger resiliently mounted in an opening in said piston rod, said plunger comprising a valve portion adapted to close a dual valve and a shaft portion having a central opening connected to said unidirectional outlet valve, a transverse passage on said shaft connecting the outside to the inside and openings on the surface of said shaft gradually ensmalling from said transverse opening toward the valve end thereof wherein as the piston approaches an end said valve end of said shaft closes said dual opening and the fluid outlet from said valve is then directed through the transverse opening of said shaft to the interior of said shaft and then to the unidirectional outlet valve, said opening gradually restricting as the piston approaches the end of its stroke.

6. A self-contained power cylinder and control which comprises a cylinder having a head end and rod end, a piston in said cylinder, said head end having a restricted unidirectional outlet valve for restricting the flow of air, a by-pass means closable by said piston to direct output air to said unidirectional valve as the piston approaches the head end, and an inlet port on said head end for directing air to said piston, said rod end of said cylinder containing pilot-operated control valves, one of said valves being normally open to direct pressure fluid from a source to the piston at the rod end and the other being normally closed to direct exhaust fluid from the head end of said cylinder to an exhaust opening, each of said valves being shiftable by pilot pressure to positions where they change their respective functions to direct pressure to the inlet port at the head end of the cylinder and to connect the rod end of the cylinder to exhaust.

7. A device as defined in claim 6 in which the control valves are each mounted in stepped bores having an enlarged portion, an intermediate portion and a small portion, the normally open control valve being connected to pressure at the small portion, the normally closed control valve being connected to exhaust at the small portion, the intermediate portions of the valve recesses containing spaced opposed valve seats, and a valve member in said intermediate portions between said valve seats, the intermediate portion of said normally open valve being connected to exhaust and to the piston rod opening in said rod end, the intermediate portion of said normally closed valve being connected to exhaust and to a passage leading to said head end and pilot-operated means in the enlarged portion of said bores for actuating said valve members from one seat to another.

8. A valve construction as defined in claim 7 in which the valve seats comprise ring members supported in said intermediate stepped portion of said control valve bores, said ring members being spaced by an open cage member having its ends received in annular grooves in said ring members and sealing rings on said ring members for sealing said ring members in said intermediate portion of said valve bores.

9. A device as defined in claim 8 in which the upper ring member has an axial projection extending into the enlarged recess of said valve bores having an outwardly extending flange which projects toward the walls of the enlarged portions and pilot-operated means in said enlarged portions comprising a diaphragm mounted on said flange portion, and means connecting said diaphragm to said valve member between said valve seat rings.

10. A device as defined in claim 7 in which pilot-operated means for the valve members is mounted in the enlarged portions of said valve bores, said pilot-operated means comprising a first diaphragm operably connected to the valve member between said valve seats and a second diaphragm mounted above said first diaphragm and a closure member for closing the enlarged end of said bores, and tandem passages, the first of which connects said large bores above said second diaphragm and the second of which connects said large bores between said diaphragms wherein initial actuating pilot pressure may be introduced into the first of said tandem passages to actuate said valve members and secondary holding pressure may be introduced into the second of said tandem passages to hold said valve members in actuated position.

11. A device as defined in claim 10 in which the diaphragms comprise flexible discs having an outer annular ring to serve as a sealing ring, and the supporting means for said diaphragms comprise an upper outwardly extending flange from one of said valve seats into the enlarged portion of said stepped bores, an intermediate spacing ring fitted into said enlarged bore and a capping member closing the end of said large bore, each of said members having recesses to receive the annular sealing rings on said diaphragms and each of said members having inside said sealing rings a beveled annular surface to serve as a support for said diaphragms in their outer annular portions in either of the shifted positions of said diaphragms, and center discs on each side of said diaphragms adapted to reciprocate with said diaphragms within said members in said enlarged portions of the stepped valve bores.

12. A device as defined in claim 11 in which the central members on each side of said diaphragm are connected to each other by rivets which are in axial contact in the assembly.

13. A device as defined in claim 11 in which the valve assembly is held in place by a spanning plate anchored on said head and in contact at each end with said valve caps.

14. A device as defined in claim 10 in which there is mounted in said rod end on the piston side thereof a unidirectional valve, a pin in said valve to be mechanically actuated by said piston as it approaches the rod end and a connection from the intermediate portion of the normally closed valve leading to said unidirectional valve to be connected when said pin is actuated to said second tandem passage to direct air pressure to the enlarged bores between said diaphragms to act as holding pressure for said valves in actuated position.

15. A device as defined in claim 6 in which the control valves are held in the described normally open and normally closed positions by the main pressure in the circuit.

16. A device as defined in claim 6 in which a holding valve is provided in said rod end actuated by said piston as it approaches said rod end for directing holding pilot pressure to said control valves to hold them in their actuated position.

17. A device as defined in claim 6 in which the pressure inlet to the normally open control valve passes through a unidirectional valve wherein pressure in the rod end of the cylinder resulting from a load on the cylinder will be locked in place in the event of power failure in the circuit.

18. A rod end for a pneumatic cylinder which comprises a body having a recess on one side thereof for receiving the end of a cylinder shell, means for locking said body to said shell, a piston rod opening passing through said body co-axial with said cylinder recess and co-axial with said shell, valve recesses in said body on opposite sides of said piston rod opening comprising stepped bores, each having a pressure opening and an exhaust opening, a pair of passages parallel to said valve openings also spaced on either side of said piston rod openings intersecting said valve openings at the large portion of the stepped opening to serve respectively as pressure and exhaust openings, crossed passages in said body at the small end of said stepped bores leading from an outer surface of said body to the bottom of said stepped bores to serve respectively as pressure and exhaust openings, cylinder port openings into the intermediate portions of said stepped bores, and valves in said stepped bores for selectively directing pressure to said cylinder ports to operate a piston.

19. In a cylinder end as defined in claim 18, valve inserts for said stepped bores in which all of the working parts of the valves are inserted into the bores, said inserts comprising a pair of spaced seats, means spacing said seats, a valve between said seats supported on an operating stem, a valve actuating member on said stem spaced above said seats, and means for retaining said parts in said bore.

20. A device as defined in claim 19 in which the valve actuating member comprises a flat circular diaphragm, opposed washers on either side of the central portion of said diaphragm, means holding said washers together with sufficient pressure that said diaphragm is forced into a dished shape, said central washers being connected to said operating stem.

21. A device as defined in claim 20 in which the second actuating member comprises a second circular diaphragm between retaining washers having means to contact one of the washers of the first diaphragm.

22. A device as defined in claim 19 comprising a supplemental valve actuating member in each of said stepped bores positioned to exert pressure on said first valve actuating member in each of said bores in response to a pilot pressure actuation, and additional pilot air passages in said head extending across said body in parallel spaced relation on either side of said stepped bores having passages connecting into said stepped bores to reach said bores adjacent said valve actuating members.

23. A control valve for pneumatic pistons and the like which comprises a body having a stepped bore with three progressively increasing sections from one end to the other, exhaust and pressure ports respectively connected to the smallest of said bores and the largest of said bores, and a control valve in said stepped bores in which all of the operating parts are inserted into said bore, said valve comprising spaced seats in the next to the largest of said bores, means to space said seats, a valve actuating member support in the largest of said bores, a valve member between said seats extending into said valve actuating member support, a valve actuating member supported on said valve actuating member support associated with said stem, means to retain said valve actuating member in said largest of said bores, and a second valve actuating member supported in the largest of said bores adjacent and operatively associated with said first valve actuating member, said second valve actuating member being adapted to be actuated by pilot control air received into passages in the largest of said bores to hold said valve in one of two operating positions.

24. A control valve for pneumatic pistons and the like which comprises a body having a stepped bore with three progressively increasing sections from one end to the other, exhaust and pressure ports respectively connected to the smallest of said bores and the largest of said bores, and a control valve in said stepped bores in which all of the operating parts are inserted into said bore, said valve comprising spaced seats in the next to the largest of said bores, means to space said seats, a valve actuating member support in the largest of said bores, a valve member between said seats extending into said valve actuating member support, a valve actuating member supported on said valve actuating member support associated with said stem, means to retain said valve actuating member in said largest of said bores, and a second valve actuating member supported in the largest of said bores adjacent and operatively associated with said first valve actuating member, said second valve actuating member being adapted to be actuated by pilot control air received into passages in the largest of said bores to hold said valve in one of two operating positions, opposed washers mounted on either side of the central portion of said diaphragms and said diaphragms being supported by diaphragm supporting rings having an inner diameter larger than the outer diameter of said opposed washers, the inner diameter having opposed annular tapered seats for supporting the periphery of said diaphragms outside said washers in each of the actuated positions thereof, said rings having radial openings to permit control pressure to reach said diaphragms from the largest portion of the stepped bore.

25. A control valve for pneumatic pistons and the like which comprises a body having a stepped bore with three progressively increasing sections from one end to the other, exhaust and pressure ports respectively connected to the smallest of said bores and the largest of said bores, and a control valve in said stepped bores in which all of the operating parts are inserted into said bore, said valve comprising spaced seats in the next to the largest of said bores, means to space said seats, a valve actuating member support in the largest of said bores, a valve member between said seats extending into said valve actuating member support, a valve actuating member supported on said valve actuating member support associated with said stem, means to retain said valve actuating member in said largest of said bores, and a second valve actuating member supported in the largest of said bores adjacent and operatively associated with said first valve actuating member, said second valve actuating member being adapted to be actuated by pilot control air received into passages in the largest of said bores to hold said valve in one of two operating positions, opposed washers mounted on either side of the central portion of said diaphragms and said diaphragms being supported by diaphragm supporting rings having an inner diameter larger than the outer diameter of said opposed washers, the inner diameter having opposed annular tapered seats for supporting the periphery of said diaphragms outside said washers in each of the actuated positions thereof, said rings having radial openings to permit control pressure to reach said diaphragms from the largest portion of the stepped bore, all of the insertable parts in said stepped bore being retained by a solid disc member capping the open end of said large bore.

References Cited in the file of this patent

UNITED STATES PATENTS

| | | |
|---|---|---|
| 1,828,643 | Cannon | Oct. 20, 1931 |
| 2,045,445 | Davis | June 23, 1936 |
| 2,230,145 | Lechler | Jan. 28, 1941 |
| 2,361,757 | Fink | Oct. 31, 1944 |
| 2,382,457 | Wertman et al. | Aug. 14, 1945 |
| 2,444,228 | Huthsing | June 29, 1948 |
| 2,459,456 | Rockwell | Jan. 18, 1949 |
| 2,493,602 | Sterret | Jan. 3, 1950 |
| 2,502,290 | Szitar | Mar. 28, 1950 |
| 2,673,130 | Becker | Mar. 23, 1954 |
| 2,677,933 | Hopkinson | May 11, 1954 |
| 2,719,510 | Elder | Oct. 4, 1955 |
| 2,775,982 | Canfield | Jan. 1, 1957 |
| 2,783,742 | Shafer | Mar. 5, 1957 |
| 2,786,452 | Tucker | Mar. 26, 1957 |
| 2,811,168 | Davies et al. | Oct. 29, 1957 |
| 2,811,170 | Schmidt | Oct. 29, 1957 |
| 2,853,974 | Hewitt | Sept. 30, 1958 |
| 2,896,587 | Hause | July 28, 1959 |
| 2,897,785 | Ortman | Aug. 4, 1959 |
| 2,910,051 | Hupp | Oct. 27, 1959 |
| 3,019,773 | Meeker | Feb. 6, 1962 |